(12) United States Patent
Ha et al.

(10) Patent No.: US 7,539,206 B2
(45) Date of Patent: May 26, 2009

(54) COMMUNICATION APPARATUS AND METHOD FOR SUPPORTING CARRIER SENSE MULTIPLE ACCESS/COLLISION DETECTION

(75) Inventors: Sam Chul Ha, Changwon-shi (KR); Seung Myun Baek, Changwon-shi (KR); Koon Seok Lee, Changwon-shi (KR); Jeong Hyun Lim, Kimhae-shi (KR); Hwan Jong Choi, Changwon-shi (KR); Ja In Koo, Jinju-shi (KR); Dae Woong Kim, Changwon-shi (KR); Sung Hwan Kang, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 695 days.

(21) Appl. No.: 10/480,110

(22) PCT Filed: Apr. 9, 2002

(86) PCT No.: PCT/KR02/00633

§ 371 (c)(1),
(2), (4) Date: Dec. 9, 2003

(87) PCT Pub. No.: WO02/101992

PCT Pub. Date: Dec. 19, 2002

(65) Prior Publication Data

US 2004/0160976 A1   Aug. 19, 2004

(30) Foreign Application Priority Data

Jun. 9, 2001   (KR) ............................... 2001-32308

(51) Int. Cl.
*H04L 12/413*   (2006.01)

(52) U.S. Cl. .................. 370/448; 370/462; 370/463; 370/489

(58) Field of Classification Search ................. 370/445, 370/447, 448, 462, 463, 489
See application file for complete search history.

(56) References Cited

U.S. PATENT DOCUMENTS 4,516,122 A * 5/1985 Tomikawa .................. 370/447

(Continued)

FOREIGN PATENT DOCUMENTS

EP   0 833 479 A1   4/1998

(Continued)

OTHER PUBLICATIONS

International Search Report, Korean Intellectual Property Office, Jul. 25, 2002.

*Primary Examiner*—Hassan Kizou
*Assistant Examiner*—Bo Hui A Zhu
(74) *Attorney, Agent, or Firm*—McKenna Long & Aldridge LLP

(57) ABSTRACT

A communication apparatus and a method for supporting carrier sense multiple access/collision detection (CSMA/CD) are disclosed. In a home network having a plurality of peripheral apparatuses in one home bus, the communication apparatus includes an interface circuit for transmitting and receiving packet data by being connected to the home bus; a data transmitting circuit for converting transmission data generated from inner peripheral apparatuses into physical transmission data and then for outputting the data on the home bus through the interface circuit; a data receiving circuit for determining whether data transmitted from other peripheral apparatuses through the interface circuit are received in its own peripheral apparatus and for checking a current state of the home bus; a collision detection circuit for continuously detecting a current state of the home bus through the data receiving circuit; and a communication controlling part for controlling data which are output form the data transmitting circuit by detecting a state of the home bus detected from the collision detection circuit.

10 Claims, 4 Drawing Sheets

U.S. PATENT DOCUMENTS

| | | | | |
|---|---|---|---|---|
| 5,353,287 A | * | 10/1994 | Kuddes et al. | 370/448 |
| 5,600,310 A | * | 2/1997 | Whipple et al. | 340/3.51 |
| 5,841,778 A | | 11/1998 | Shaffer et al. | |
| 6,272,147 B1 | * | 8/2001 | Spratt et al. | 370/447 |
| 6,556,561 B1 | * | 4/2003 | Himbeault et al. | 370/352 |
| 6,868,295 B2 | * | 3/2005 | Huang | 700/90 |
| 6,906,617 B1 | * | 6/2005 | Van der Meulen | 340/538 |
| 2001/0049761 A1 | * | 12/2001 | Huang | 710/126 |
| 2003/0041161 A1 | * | 2/2003 | Billings et al. | 709/231 |

FOREIGN PATENT DOCUMENTS

| | | |
|---|---|---|
| EP | 0833479 A1 | 4/1998 |
| JP | 03-268534 | 11/1991 |
| JP | 3268534 | 11/1991 |

* cited by examiner

| Preamble | Receiver's code | Sender's code | Priority | Control code | Error code |
|---|---|---|---|---|---|

COMMUNICATION APPARATUS AND METHOD FOR SUPPORTING CARRIER SENSE MULTIPLE ACCESS/COLLISION DETECTION

TECHNICAL FIELD

The present invention relates to a home network system, and more particularly to a communication apparatus and a method for supporting carrier sense multiple access/collision detection (hereinafter, it is referred to as CSMA/CD) of peripheral apparatuses that are connected to a home bus in the home network.

BACKGROUND ART

A home network system is a system for controlling household appliances, such as, PC, cellular phone, refrigerator, or washing machine, by one network.

In fact, the plural appliances are interconnected through a home bus, and to do so, a protocol, which is capable of integrating many signals for each appliance and controlling the signals, is absolutely necessary. One of typical examples of the protocol is CSMA/CD.

The most essential element in the CSMA/CD system is to create more effective communication in spite of some possible collisions that are generated as several appliances use one single home bus.

FIG. 1 is a diagram of a known collision detection method in CSMA/CD system.

Referring to FIG. 1, if a peripheral apparatus (it is used interchangeably with peripheral apparatus) has data to transmit, the peripheral apparatus generates a packet data and then waits until a home bus is in an idle state. Once the home bus is in the idle state, the peripheral apparatus performs a busy check, that is, the apparatus checks whether the home bus has been idle continuously for a certain amount of time. Here, the busy check time period is set equally for every appliance.

At the result of the busy check, if the home bus is currently in the idle state, the data is transmitted to a corresponding appliance through the home bus, while if it turns out that the home bus is currently in the busy state, the transmission is delayed for a certain amount of time, and after that, the busy check conducted again.

In this manner, a plurality of peripheral apparatus can transmit data to one single home bus simultaneously.

However, the method has a drawback as follows.

For example, FIG. 2 is a diagram illustrating some problems with the collision detection method based on a conventional CSMA/CD system.

As shown in FIG. 2, suppose that a first transmission apparatus and a second transmission apparatus are ready to transmit data at the same time, and perform the busy check on the home bus in the idle state. In such case, since the data transmission from each apparatus is done simultaneously in a certain amount of time upon finishing the busy check, there is a lot of collision in the home bus, and as a result thereof, transmission error occurs.

DISCLOSURE OF INVENTION

It is, therefore, an object of the present invention to provide a communication apparatus and a method for supporting carrier sense multiple access/collision detection (CSMA/CD), which is capable of providing more stable communication by assigning a different busy check time to each peripheral apparatus in accordance with priority.

To achieve the above object, there is provided a communication apparatus for supporting carrier sense multiple access/collision detection (CSMA/CD) for use of a home network wherein a plurality of peripheral apparatuses are connected to a home bus, the communication apparatus including: an interface circuit for transmitting and receiving packet data by being connected to the home bus; a data transmitting circuit for converting transmission data generated from inner peripheral apparatuses into physical transmission data and then for outputting the data on the home bus through the interface circuit; a data receiving circuit for determining whether data transmitted from other peripheral apparatuses through the interface circuit are received in its own peripheral apparatus and for checking a current state of the home bus; a collision detection circuit for continuously detecting a current state of the home bus through the data receiving circuit; and a communication controlling part for controlling data which are output from the data transmitting circuit by detecting a state of the home bus detected from the collision detection circuit.

Preferably, the data that is converted in the data transmission circuit before being output includes a preamble, a receiver's code, a sender's code, priority, a control code, and an error code.

Another aspect of the present invention provides a method for supporting carrier sense multiple access/collision detection (CSMA/CD), the method including the steps of: assigning priority to each peripheral apparatus and defining a different busy check time period for the apparatuses in accordance with the priority; if an apparatus has a data to transmit, preparing the data for transmission by converting the data to a packet signal to be in correspondence to a home bus; if the home bus is currently in a busy state, waiting for a certain amount of time, and rechecking the state of the home bus, and if the home bus is in an idle state, continuously checking whether the home bus is in the idle state for the defined busy check time period; and if the state of the home bus changes to the busy state, waiting for a certain amount of time, and then checking the state of the home bus again, and if the home bus is continuously in the idle state for the defined busy check time period, transmitting a packet data.

Preferably, the busy check time period for a peripheral apparatus with higher priority is defined shorter than the busy check time period for a peripheral apparatus with lower priority.

BRIEF DESCRIPTION OF DRAWINGS

The above objects, features and advantages of the present invention will become more apparent from the following detailed description when taken in conjunction with the accompanying drawings, in which.

BEST MODE FOR CARRYING OUT THE INVENTION

A preferred embodiment of the present invention will now be described with reference to the accompanying drawings.

Figure 1:
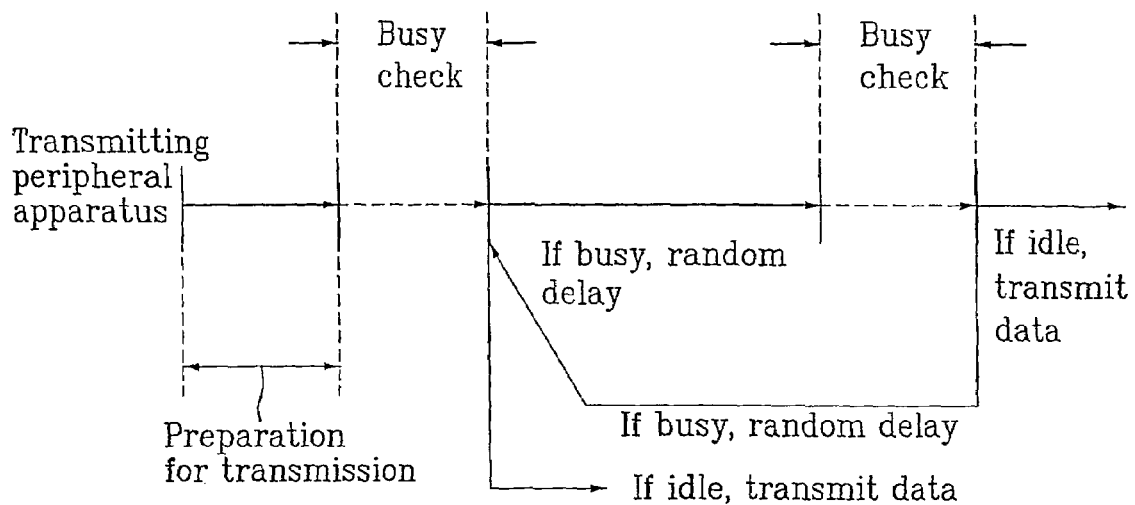
FIG. 1 is a diagram of a known collision detection method based on the carrier sense multiple access/collision detection (CSMA/CD) system.
Figure 2:
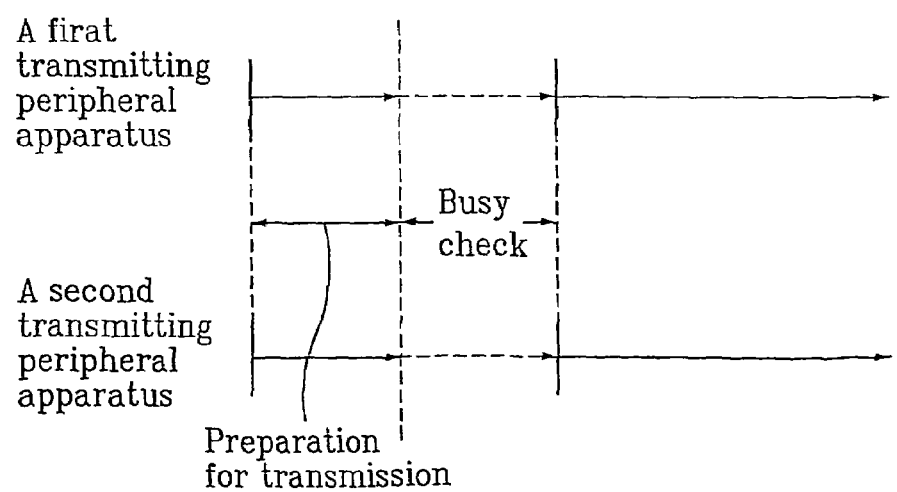
FIG. 2 is a diagram illustrating a problem with collision detection method based on the carrier sense multiple access/collision detection (CSMA/CD) system.
Figure 3:
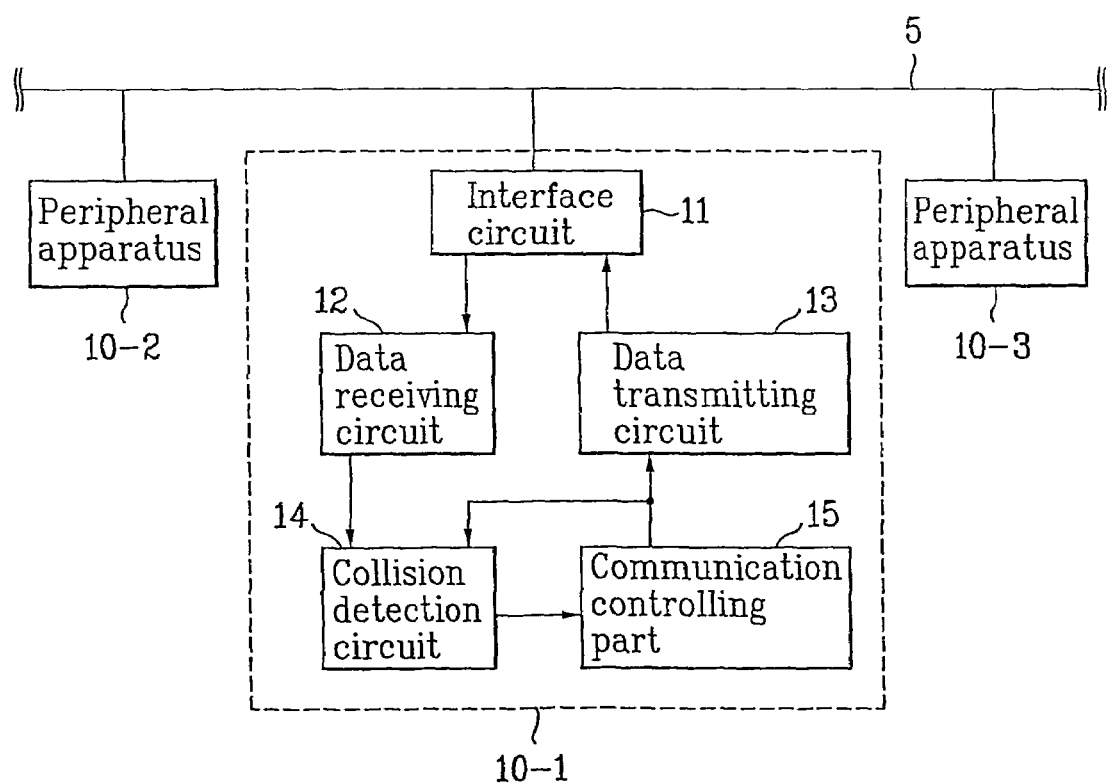
FIG. 3 diagrammatically shows a configuration of a home network for implementing the CSMA/CD on a home bus in accordance with the present invention.

FIG. 3 diagrammatically shows a configuration of a home network for implementing the CSMA/CD on a home bus in accordance with the present invention.

As shown in the drawing, a plurality of peripheral apparatuses 10-1, 10-2, and 10-3 are connected to one home bus 5. These peripheral apparatuses 10-1, 10-2, and 10-3 compete with one another to use the home bus 5. Normally, a peripheral apparatus with high priority wins the competition, and transmits data on the home bus 6. The peripheral apparatuses generally indicate household appliances like refrigerator, washing machine, PC, air conditioner, or microwave.

The peripheral apparatus includes an interface circuit 12, a data receiving circuit 12, a data transmitting circuit 13, a collision detection circuit 14, and a communication controlling part 15.

The interface circuit 12 directly transmits/receives data by being connected to the home bus 5. More specifically, the interface circuit 12 outputs an output from the data transmitting circuit 13 on the home bus 5, and receives transmission data existing in the home bus 5 and inputs the data into the data receiving circuit 12.

The data transmitting circuit 13 converts transmission data generated from the communication controlling part 15 into physical transmission data that is usually transmitted from a peripheral apparatus, and then outputs the physical transmission data on the home bus 5 through the interface circuit 11. On the other hand, the data receiving circuit 11 converts inputted receiving signals from the interface circuit 11 into receiving data, and finds out a current state of the home bus 5 before outputting the converted data to the collision detection circuit 14 and to the communication controlling part 15.

Here, the standard-sized home bus 5 is divided into an information channel and a control channel, and each channel is subdivided into twisted fair cables.

The collision detection circuit 14 continuously compares current transmission data with current receiving data during transmission process, and if a different bit from its own transmitted data bit is received, the collision detection circuit 14 concludes that the home bus is currently being occupied by another peripheral apparatus, and generates a collision detection signal to the communication controlling part 15.

The communication controlling part 15 controls input/output of transceiving data, and if it detects any collision detection signal in the course of transmitting, it maintains random waiting state, and continuously checks the state of the home bus.

The operation of the communication method for supporting carrier sense multiple access/collision detection (CSMA/CD) embodying the principles of the present invention is now detailed with reference to the drawings.

Figure 4:
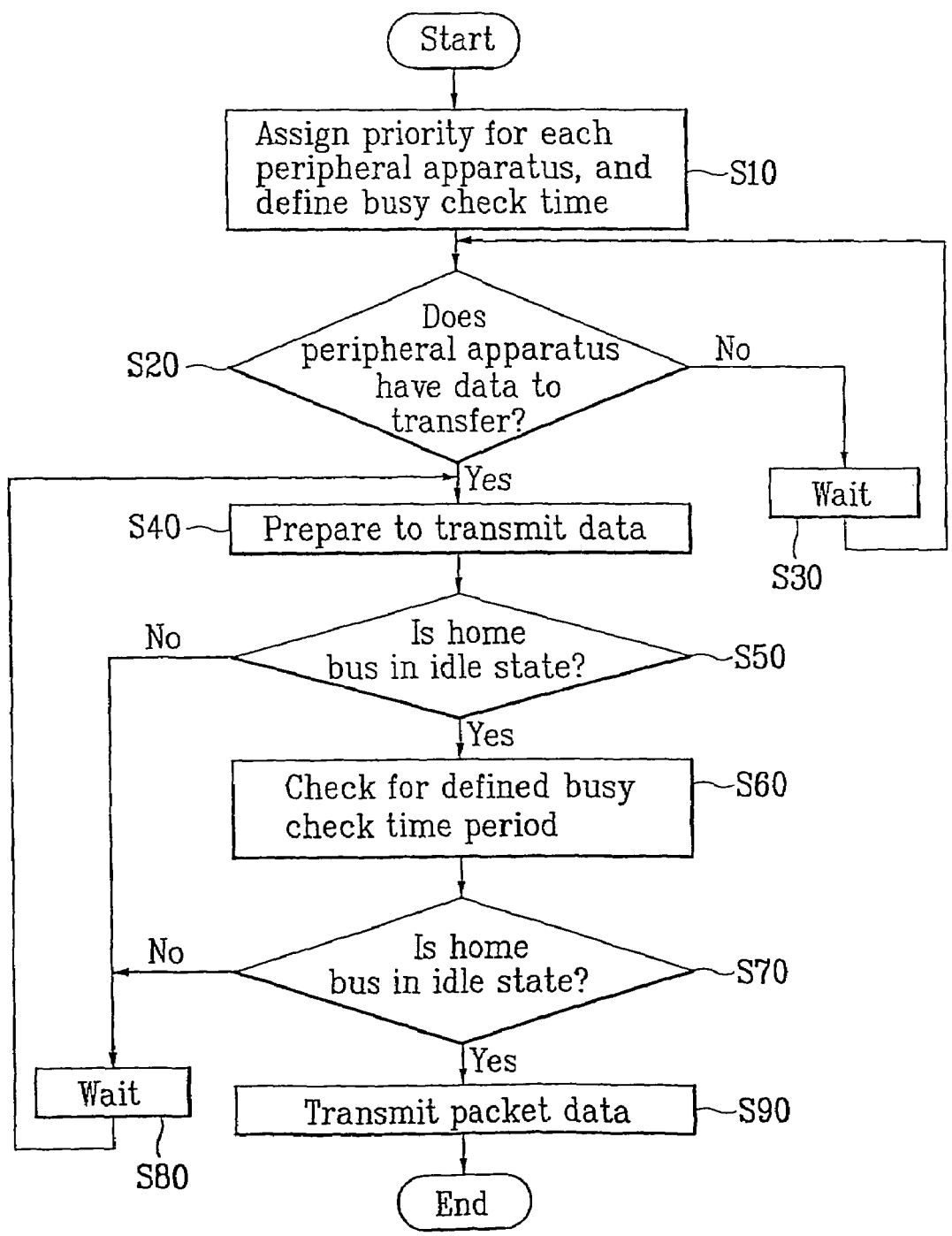
FIG. 4 is a flow chart depicting an operation of the home network for implementing the CSMA/CD on a home bus in accordance with the present invention.

FIG. 4 is a flow chart depicting an operation of the home network for implementing the CSMA/CD on a home bus in accordance with the present invention.

Referring to FIG. 4, the communication controlling part 15 first determines priority of each peripheral apparatus, and defines a busy check time period for each apparatus in accordance with the priority (S10).

Then, it is determined whether a peripheral apparatus has data to transmit (S20), and if there is no data to be transmitted, the apparatus maintains the waiting state for a certain amount of time (S30), and rechecks whether there is data to be transmitted. If it turns out that there is data to be transmitted, the apparatus prepares to transmit the data (S40).

Figures 5, 6:
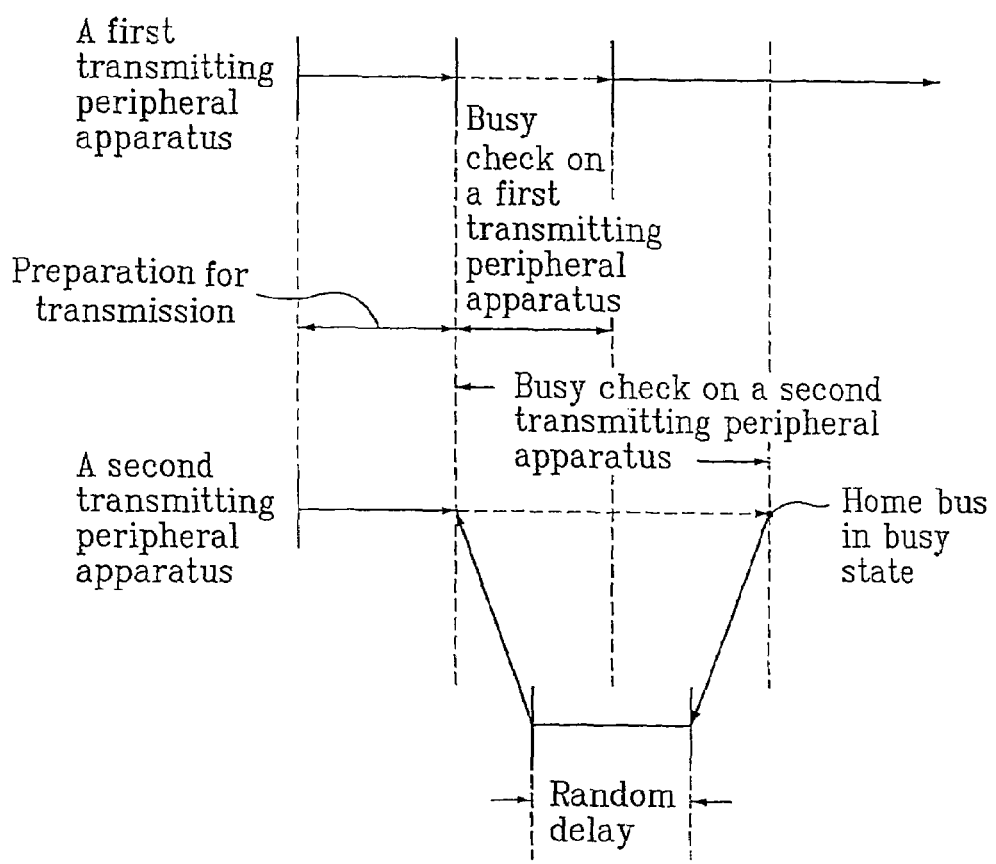
FIG. 5 is a diagram showing an operation to which the communication method for supporting carrier sense multiple access/collision detection (CSMA/CD) is applied in accordance with the present invention.
FIG. 6 diagrammatically depicts a configuration of a packet data in accordance with the present invention.

Particularly, the communication controlling part 15 prepares to transmit the data by generating a packet data including a plurality of byte data. As shown in FIG. 6, the packet data includes a preamble, a receiver's code, a sender's code, priority, a control code, and an error code. Then, the data transmitting circuit converts thusly configured packet data into signals corresponding to the home bus 5.

When the data to be transmitted is converted into signals in a packet to be in correspondence to the home bus 5, the home bus 5 is checked whether it is in idle state (S50). If the home bus is in busy state, the communication controlling part waits for a certain amount of time (S80), and then rechecks the state of the home bus 5 (S50).

If it turns out that the home bus 5 is in idle state, the home bus 5 is continuously checked for the busy check time period that is determined by the communication controlling part 15 (S70).

In case that the home bus 5 goes back to the busy state again in the middle of the process, the communication controlling part 15 waits for a certain amount of time (S80), and rechecks the state of the home bus 5. If the home bus 5 is in idle state continuously during the determined busy check time period, the communication controlling part 15 transfers a transmission control signal to the data transmitting circuit 13, and transmits the packet data through the interface circuit 11 (S90).

The above-described method is particularly useful for solving the conventional problem during the data transceiving process, as manifested in FIG. 5.

FIG. 5 is a diagram showing an operation to which the communication method for supporting carrier sense multiple access/collision detection (CSMA/CD) is applied in accordance with the present invention.

Referring to FIG. 5, a first transmitting peripheral apparatus and a second transmitting peripheral apparatus completed the preparation for data transmission, and are performed the busy check at the same time.

Suppose that the first transmitting peripheral apparatus has higher priority than the second transmitting peripheral apparatus. This means that the busy check time period of the first transmitting peripheral apparatus is shorter than that of the second transmitting peripheral apparatus.

Therefore, even though the first transmitting peripheral apparatus and the second transmitting peripheral apparatus might perform the busy check at the same time, since the busy check time assigned to the first transmitting peripheral apparatus ends earlier than that of the second transmitting peripheral apparatus, data transmission is successfully done. While the first transmitting peripheral apparatus is using the home bus 5, the second transmitting peripheral apparatus enters the delay state, thereby avoiding a collision between two peripheral apparatuses.

While the invention has been shown and described with reference to certain preferred embodiments thereof, it will be understood by those skilled in the art that various changes in form and details may be made therein without departing from the spirit and scope of the invention as defined by the appended claims.

INDUSTRIAL APPLICABILITY

In conclusion, the communication apparatus and the method for supporting carrier sense multiple access/collision detection (hereinafter, it is referred to as CSMA/CD) according to the present invention have advantages as follows:

First of all, as a plurality of peripheral apparatuses tries to do communication at the same time, the collision among data can be prevented and therefore, no communication failure occurs on the communication line.

Secondly, as the data with greater urgency needs to be communicated, its transmission rate is even higher.

What is claimed is:

1. A method for supporting carrier sense multiple access/collision detection (CSMA/CD) on a home bus connecting a plurality of peripheral apparatuses, the method comprising:
    assigning priority to each peripheral apparatus and defining a different busy check time period for the peripheral apparatuses in accordance with the priority;
    if a peripheral apparatus has data to transmit, preparing the data for transmission by converting the data to a packet signal to be in correspondence to the home bus;
    if the home bus is in a busy state, waiting for a certain amount of time and rechecking the state of the home bus, and if the home bus is in an idle state, continuously checking the home bus during the defined busy check time period, to determine whether the home bus is in the idle state or whether the home bus changes to the busy state; and
    if the state of the home bus changes to the busy state during the defined busy check time period, waiting for a certain amount of time and then checking the state of the home bus again, and
    if the home bus is continuously in the idle state for the defined busy check time period, transmitting the packet signal.

2. The method according to claim 1, wherein the busy check time period defined for a peripheral apparatus with higher priority is shorter than the busy check time period defined for a peripheral apparatus with lower priority.

3. A method for supporting carrier sense multiple access/collision detection on a home bus connecting a plurality of peripherals, the method comprising:
    assigning priority to each peripheral of the plurality of peripherals;
    defining a busy check time period for each peripheral in accordance with the assigned priority;
    initially checking a current state of the home bus according to the priority assigned to a peripheral having data to transmit, said initially checking including:
    rechecking, if the home bus is in a busy state according to said initially checking, the current state of the home bus after waiting a predetermined time, and
    continuously checking the current state of the home bus during the defined busy check time period, if the home bus is in an idle state according to said initially checking, to determine whether the home bus remains in an idle state during the defined busy check time period or whether the home bus changes from the idle state to a busy state during the defined busy check time period; and
    performing said initially checking again after waiting a predetermined time, if said continuously checking determines that the home bus has changed from the idle state to a busy state during the defined busy check time period.

4. The method according to claim 3, further comprising:
    transmitting to the home bus the data of the peripheral having data to transmit, if said continuously checking determines that the home bus has remained in the idle state during the defined busy check time period.

5. The method according to claim 3, wherein the busy check time period defined for a peripheral with higher priority is shorter than the busy check time period defined for a peripheral with lower priority.

6. The method according to claim 5, further comprising:
    transmitting to the home bus the data of the peripheral having data to transmit, if said continuously checking determines that the home bus has remained in the idle state for the defined busy check time period.

7. The method according to claim 6, wherein the defined busy check time period of the higher-priority peripheral is performed concurrently with the defined busy check time period of the lower-priority peripheral, wherein said continuously checking of the defined busy check time period of the higher-priority peripheral is completed before completion of said continuously checking of the defined busy check time period of the lower-priority peripheral, and wherein the higher-priority peripheral begins the data transmission during the defined busy check time period of the lower-priority peripheral.

8. A communication apparatus for supporting carrier sense multiple access/collision detection on a home bus connecting a plurality of peripherals, the communication apparatus comprising:
    a communication controller configured to assign priority to each peripheral of the plurality of peripherals and to define a busy check time period for each peripheral in accordance with the assigned priority; and
    a collision detector coupled to said communication controller, said collision detector configured to initially check a current state of the home bus according to the priority assigned to a peripheral having data to transmit, by
    rechecking, if the home bus is in a busy state according to the initial checking, the current state of the home bus after waiting a predetermined time, and by
    continuously checking the current state of the home bus during the defined busy check time period, if the home bus is in an idle state according to the initial checking, to determine whether the home bus remains in an idle state during the defined busy check time period or whether the home bus changes from the idle state to a busy state during the defined busy check time period,
    wherein said collision detector is further configured to perform the initial checking again after waiting a predetermined time, if the continuous checking determines that the home bus has changed from the idle state to a busy state during the defined busy check time period.

9. The communication apparatus according to claim 8, wherein said communication controller is further configured to transmit to the home bus the data of the peripheral having data to transmit, if the continuous checking determines that the home bus has remained in the idle state for the defined busy check time period.

10. The communication apparatus according to claim 8, wherein the busy check time period defined for a peripheral with higher priority is shorter than the busy check time period defined for a peripheral with lower priority.

* * * * *